United States Patent [19]

Hebard

[11] 4,130,304
[45] Dec. 19, 1978

[54] WELL HEAD SEAL ASSEMBLY

[75] Inventor: Harry D. Hebard, Tulsa, Okla.

[73] Assignee: Don R. Hinderliter, Inc., Tulsa, Okla.

[21] Appl. No.: 824,000

[22] Filed: Aug. 12, 1977

[51] Int. Cl.² ............................................. F16L 39/00
[52] U.S. Cl. ................................... 285/143; 285/147; 285/346
[58] Field of Search ............... 285/140, 142, 143, 146, 285/147, 148, 137 R, 346

[56] References Cited

U.S. PATENT DOCUMENTS

| | | | |
|---|---|---|---|
| 2,001,946 | 5/1935 | Tschappat | 285/148 |
| 2,830,665 | 4/1958 | Burns et al. | 285/140 |
| 2,842,209 | 7/1958 | Gibson | 285/140 |
| 3,185,505 | 5/1965 | Lanmon | 285/143 |
| 3,291,490 | 12/1966 | Balmer | 285/146 |
| 3,329,448 | 7/1967 | Allen | 285/147 |
| 3,471,178 | 10/1969 | Roe | 285/137 R |
| 3,806,168 | 4/1974 | McGee et al. | 285/142 |
| 3,994,517 | 11/1976 | Carmichael et al. | 285/146 |

*Primary Examiner*—Robert I. Smith
*Attorney, Agent, or Firm*—William S. Dorman

[57] ABSTRACT

An improved seal assembly for a well head including a ring-shaped seal body positioned in the tubing head, a tubular coupling formed to the seal body and adapted to connect between adjacent portions of inner tubing, a lower seal ring positioned in the tubing head above the seal body and surrouding the coupling, a pliable rubber gasket positioned in the tubing head above the lower seal ring and surrounding the coupling, and an upper seal ring positioned in the tubing head above the gasket and surrounding the coupling. The seal body has a central circular opening and a radial slot for a cable. The lower seal ring has an inner circular section and an outer circular section split into an arcuate outer front section, and an arcuate outer rear section. The outer section has a semi-circular opening along the inner edge. The inner section is provided with a semi-circular opening on the outer edge which mates with the semi-circular opening on the outer section to form a passageway for the cable. The rubber gasket has a circular hole and a slit leading to the hole. The upper seal ring has an inner circular section and an outer circular section split into an arcuate outer front section and an arcuate outer rear section. The outer section has a semi-circular opening along the inner edge which mates with a semi-circular opening on the outer edge of the inner circular section to form a passageway for the cable. To assemble the device, the members are clamped together, locking the members in place, compressing the gasket and forming a liquid-tight and gas-tight seal.

6 Claims, 9 Drawing Figures

WELL HEAD SEAL ASSEMBLY

BACKGROUND OF THE INVENTION

1. Field of the Invention

This invention relates to a well head seal assembly for maintaining a liquid-tight and gas-tight seal. More particularly, this invention relates to an improved well head seal capable of being inserted in a well head and which may be easily and quickly disassembled and re-assembled in order to replace worn or broken parts in the well.

2. Description of the Prior Art

In extracting oil, water or gas from beneath the surface of the earth, such material is generally pumped up to ground level through tubing or casing. The substance is pumped up through a center pipe or tubing string located within the outer well casing. It is common to mount an electric pump at the lower end of the casing. An electric cable or cables must be allowed to pass down from above ground level into the well to service the electric pump. Above ground level, the cable or cables are connected with a power source. It is desired to create a seal around these members. This is usually done at the well head at approximately ground level.

Ideally, the seal should not be of a permanent nature since, at times, the seal must be disassembled, for example, to replace worn or broken parts in the tubing or in the pump beneath the surface of the earth.

SUMMARY OF THE INVENTION

The present invention designed for maintaining a seal within a tubing head of a well allows servicing of an inner tubing string from an outer well casing without the necessity of cutting an electrical cable or cables that service the pump.

The well head includes a seal body which has a champfered lower edge, a central circular opening, a top recessed circular portion and radial slots for the electrical cables. A coupling, threaded on the inner side, is secured centrally to the seal body.

A lower seal ring, consisting of an arcuate outer front section, an arcuate outer rear section and an inner circular section, is positioned above the seal body and around the coupling. The outer sections are provided with circular reduced portions adapted to fit into the circular recess of the seal body. The outer sections have semi-circular and quarter-circular holes along their inner edges which mate with semi-circular holes on the outer edge of the inner ring to form circular holes.

A rubber gasket, which is positioned above the lower seal ring, is split to permit the gasket to be placed around the coupling. The gasket is provided with holes for bolts to pass through. The gasket is also provided with properly sized holes for receiving the cables and these holes are provided with slits leading from the central opening.

An upper seal ring, consisting of an arcuate outer front section, an arcuate outer rear section and an inner circular section is similar to the lower seal ring except that it is not provided with a reduced circular portion.

Bolts are adapted to pass through the holes in the upper seal ring, through holes in the gasket, through the holes in the lower seal ring, and into the threaded openings of the seal body. Tightening the bolts will cause the gasket to tighten around the coupling, around the cables, and also to cause the gasket to expand radially outward to contact the inner surface of the opening in the tubing head thereby creating a liquid-tight and gas-tight seal.

In view of the above, it is a principal object and purpose of this invention to provide an improved seal assembly that may be constructed to pack off the cable or cables and to pack off the center pipe or tubing string so that leakage does not occur at the well head. It is also an object of this invention to allow simple and easy disassembly and re-assembly of its parts without the necessity of severing or disconnecting the cable or cables.

It is a further object of this invention to provide adjustable pressure in the seal through the use of multiple bolts internal to the seal members.

Still another object is to provide for suspension of the center pipe or tubing string through a metal to metal transfer of the load of the center pipe or tubing string to the body of the well.

DETAILED DESCRIPTION OF THE PREFERRED EMBODIMENTS

Figure 1:
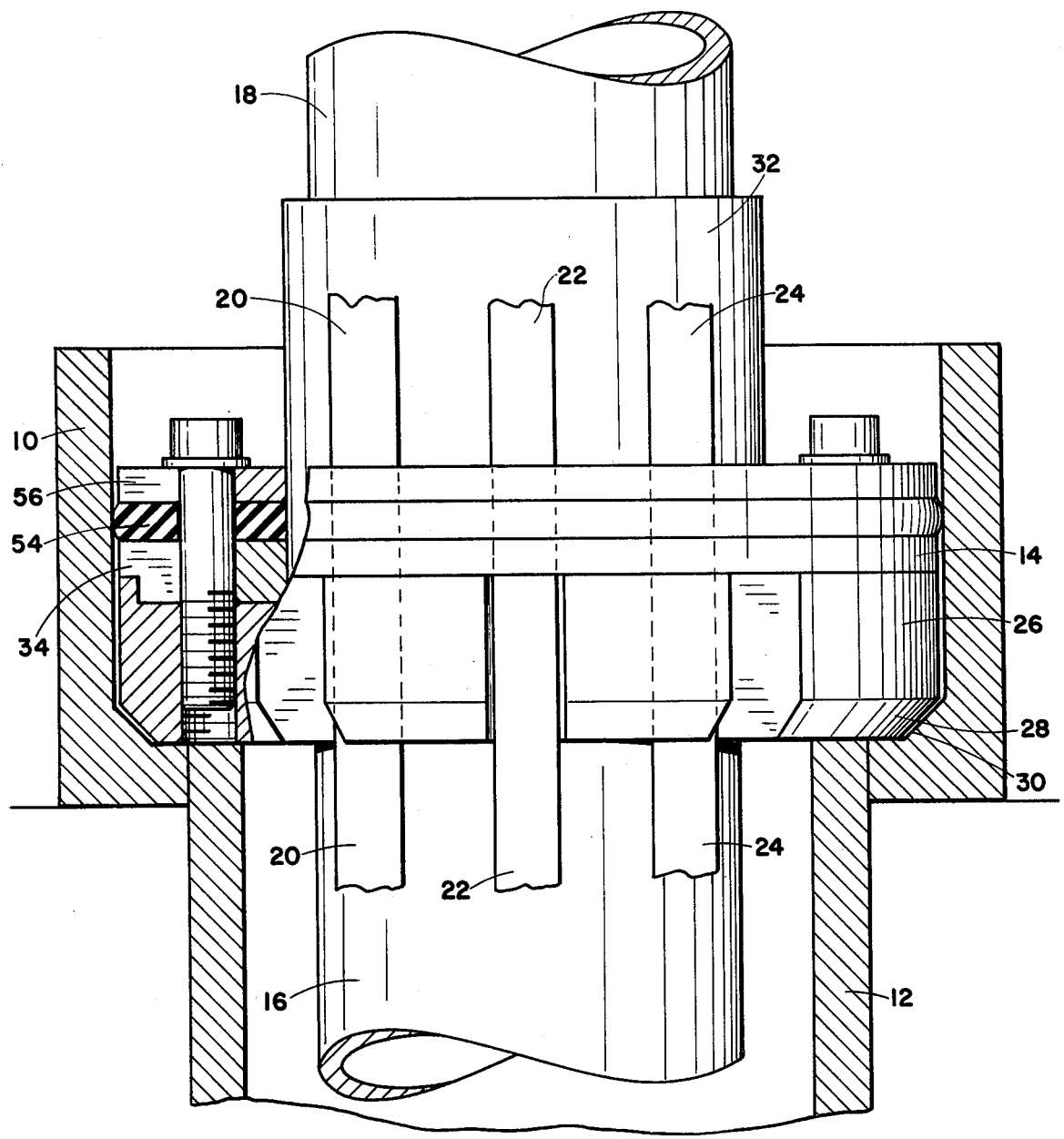
FIG. 1 is a partial sectional view of a well head seal assembly constructed in accordance with one embodiment of this invention and showing a cut-away view of one corner of the assembly.

Referring to the drawings in detail, FIGS. 1 through 8 show a well head assembly for maintaining a seal within a tubing head into which it is inserted. FIG. 1 shows a tubing head 10 which is attached to the top of the outer well tubing or casing 12. The well head seal assembly is generally designated by the reference character 14 and provides a liquid-tight and gas-tight connection between a portion of inner tubing 16 below the seal assembly 14 and an upper portion of inner tubing 16 below the well head. Three electrical cables 20, 22 and 24 pass downwardly through the seal assembly 14 and connect at their lower ends (not shown) with an electrical pump (not shown). The upper ends of the electrical cables connect with a power source (not shown). Occasionally, it becomes necessary to substitute lengths of tubing 16 or to take the entire tubing out to repair the pump. The present invention allows elevation or removal of sections of the tubing 16 or the entire tubing without having to cut or disconnect the electrical cables 20, 22 and 24. It should be understood that although three cables are utilized in the present embodiment, a single larger cable might be used.

Figure 2:
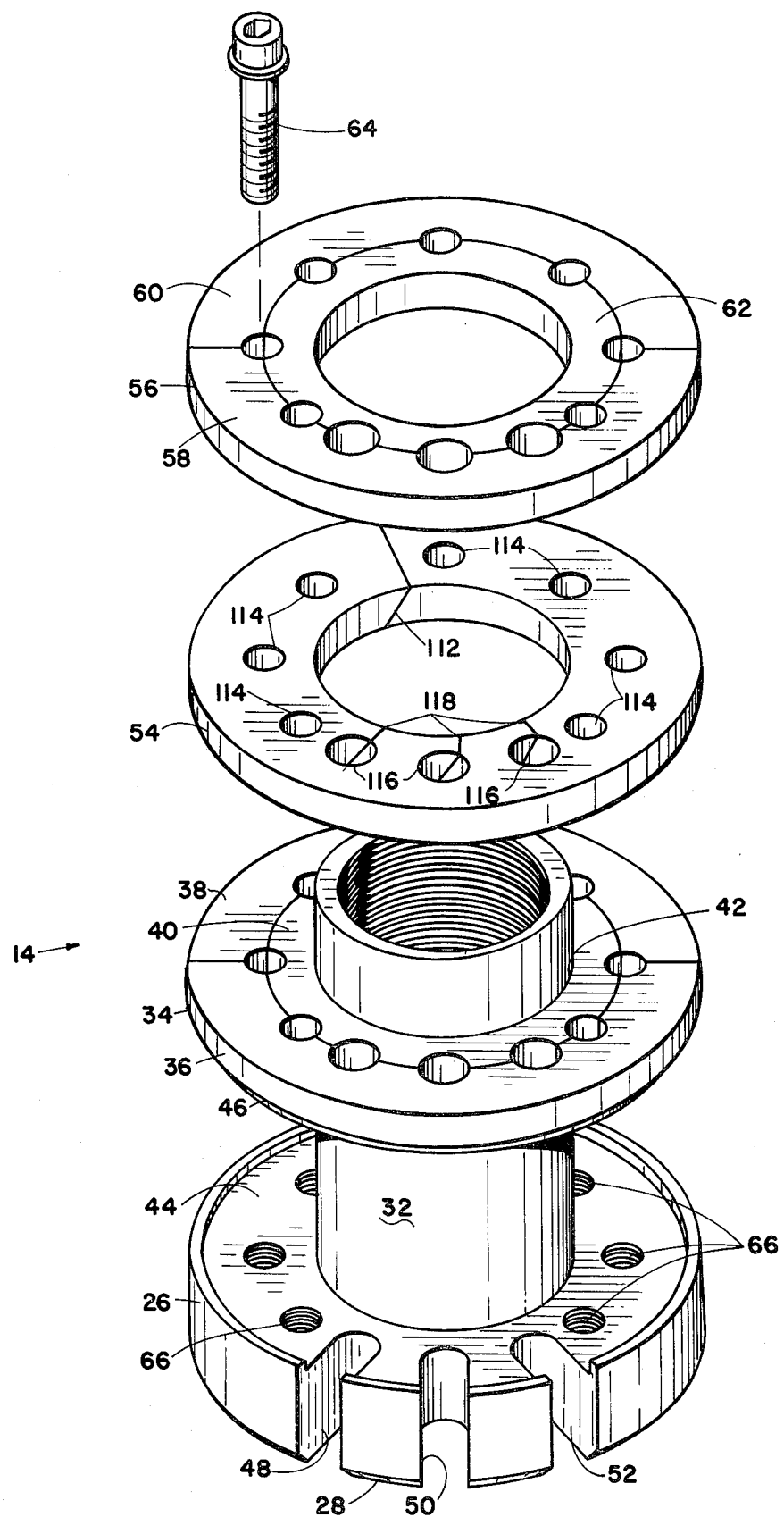
FIG. 2 is an exploded view of the well head assembly shown in FIG. 1.

FIG. 2 shows an exploded view of the seal assembly 14. The well head includes a lower seal body 26 which has a champfered lower edge 28 arranged at a 45 degree angle to mate with the inner 45 degree angle 30 on the tubing head 10. A coupling 32 is also secured centrally to the seal body 26. This coupling 32 is threaded on its inner side at the upper and lower ends thereof to receive the tubing sections 18 and 16. It should be noted that with the inner tubing sections connected to the coupling, and with the coupling secured to the seal body, a metal to metal transfer of the load of inner tubing of the body of the well is provided.

A lower seal ring 34 is provided which consists of three components: an arcuate outer front section 36, an arcuate outer rear section 28, and an inner circular section 40. The inner circular section 40 has a central opening 42 which is adapted to go around the outside of the coupling 32, the latter being sealed to the seal body 26 by welding or the like.

The seal body 26 is provided with a circular recessed portion 44, and the outer seal sections 36 and 38 are provided with circular reduced portions 46 which are adapted to fit into the circular recess 44 so as to hold the elements 36, 38 and 40 in the same relative positions shown in FIG. 2 when the sealing ring 34 is resting against the top of the seal body 26.

Figure 3:
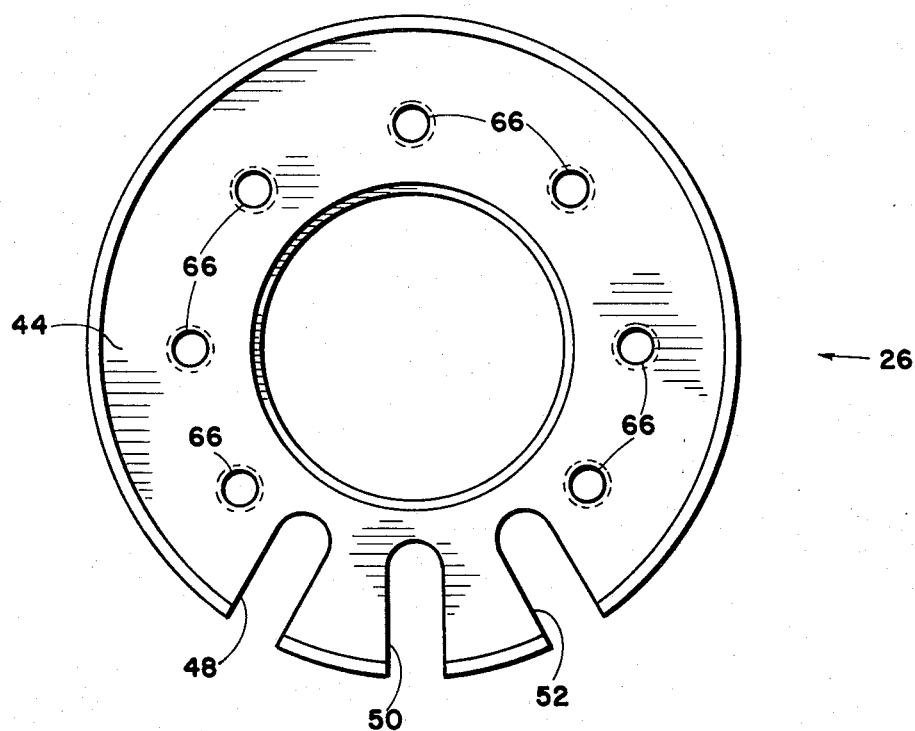
FIG. 3 is a top view of a seal body that may be employed with this invention.
Figure 4:
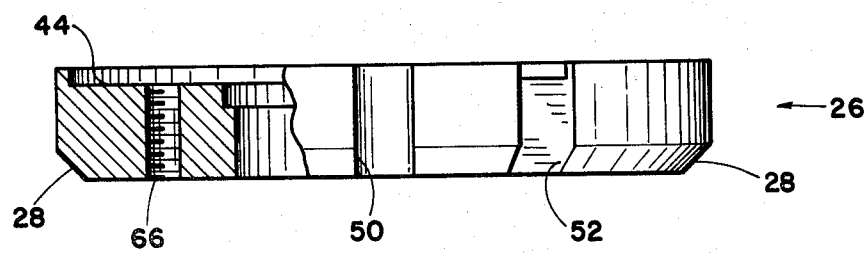
FIG. 4 is a side view of the seal body shown in FIG. 3 with a cut-away view of one corner.
Figure 5:
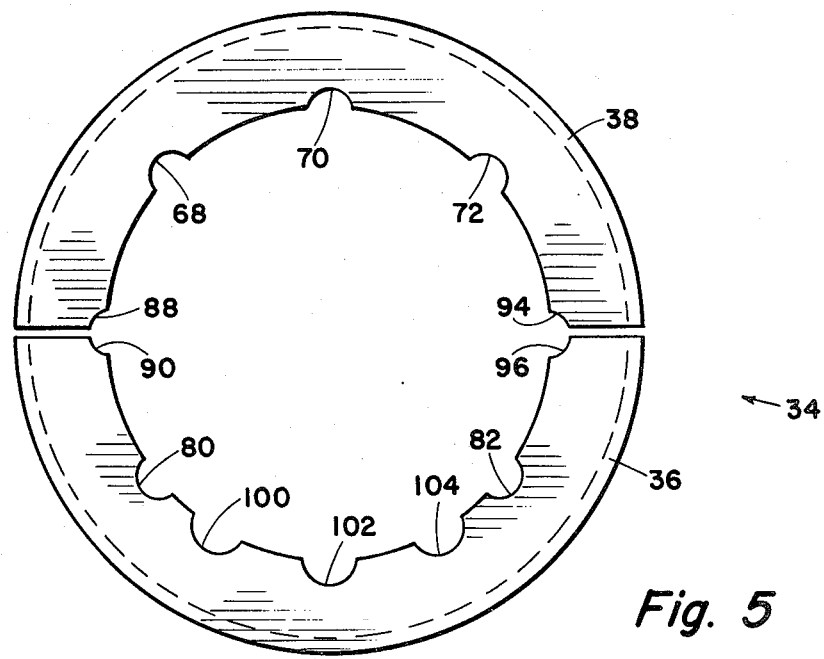
FIG. 5 is a top view of the outer seal sections of a lower seal ring showing the portions slightly separated from each other for clarity.
Figure 6:
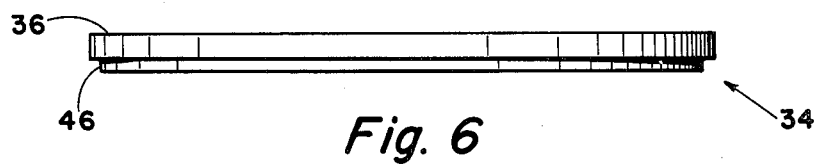
FIG. 6 is a side view of the seal sections shown in FIG. 5.
Figure 7:
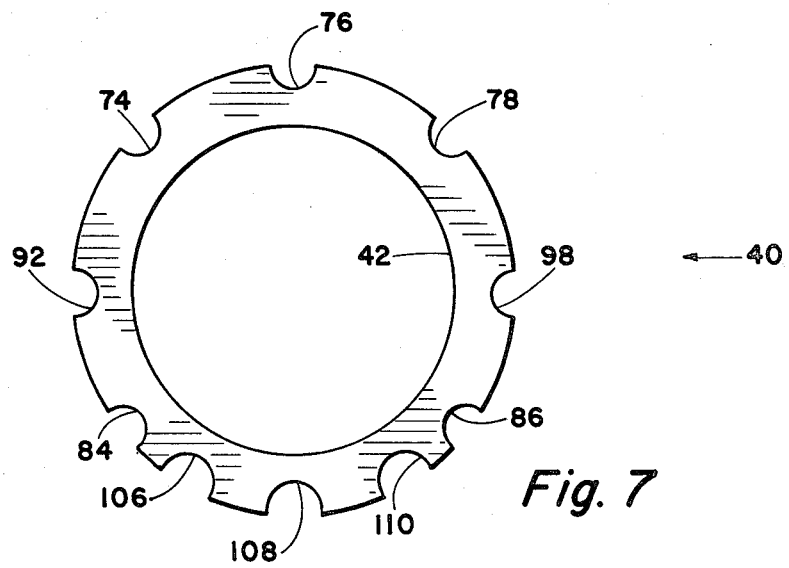
FIG. 7 is a top view of the inner seal section of the lower seal ring which is used in conjunction with the outer seal sections shown in FIG. 5.
Figure 8:
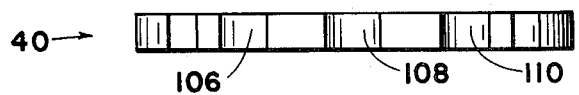
FIG. 8 is a side view of the inner seal section shown in FIG. 7.

The seal body is provided with radial slots 48, 50 and 52 for receiving cables 20, 22 and 24, respectively, therein as seen in FIGS. 2 and 3.

A rubber gasket 54 is adapted to lie above the lower seal ring 34 and beneath an upper seal ring 56, which is similar to the lower seal ring 34 except that it is not provided with a reduced portion similar to the portion 46 described above. The upper seal ring 56 is composed of three members consisting of an arcuate outer front section 58, an arcuate outer rear section 60, and an inner circular section 62, which is essentially identical to the inner seal section 40 described above. A plurality of bolts 64, only one of which is shown in FIG. 2, is adapted to pass through holes (later to be described) in the upper seal ring 56, the rubber gasket 54, the lower seal ring 34 and into the threaded openings 66 provided in the seal body 26.

With further reference to the lower seal ring 34 as shown in FIGS. 5, 6, 7 and 8, lower rear section 38 is provided with semi-circular holes 74, 76 and 78, respectively, of the lower inner section 40 to provide passageways for the bolts 64 described above. The lower front seal section 36 is provided with semi-circular holes 80 and 82 which mate with corresponding semi-circular holes 84 and 86, respectively, on the inner circular section 40 to provide additional passageways for bolts 64. The lower rear section 38 is provided with a quarter-circular hole 88, which together with the quarter-circular hole 90 on the lower front section 36, cooperate with the semi-circular hole 92 on the inner section 40 to provide another passageway for another bolt 64. Similarly, the quarter-circular holes 94 and 96 on the rear and front sections 38 and 36, respectively, cooperate with a semi-circular hole 98 on the inner section 40 to provide a passageway for another bolt 64.

The front seal section 36 is provided with semi-circular holes 100, 102, and 104 which cooperate with semi-circular holes 106, 108 and 110, respectively, on the inner section 40 to provide holes for the passage of the electrical cables 20, 22 and 24. It should be noted that the resulting holes for the electrical cables are differently sized than the resulting holes for the bolts 64.

Returning to a consideration of FIG. 2, the hole arrangement for the arcuate upper front section 58, the arcuate upper rear section 60, and the upper inner circular section 62 is exactly the same as that described above in relation to the elements 36, 38 and 40. Semi-circular holes on the upper front section 58 cooperates with semi-circular holes on the upper inner section 62 to form passageways for bolts 64. Quarter-circular holes are provided in sections 58 and 60 to cooperate with semi-circular holes on inner section 62 to provide passageways for bolts 64.

The gasket 54 is split at 112 to permit the gasket to be placed around the coupling 32. The gasket is provided with holes 114 to permit bolts 64 to pass there through. The gasket 54 is also provided with slightly larger holes 116 for receiving the cables 20, 22 and 24 there through. Finally, the gasket 54 is provided with three additional slits 118, leading from the central opening in the gasket into the holes 116 to permit the gasket to be inserted around electrical cables 20, 22 and 24.

At times the tubing 16 may be taken out to be repaired or replaced. To reinsert the tubing into the well, the upper end of the tubing 16 is threaded into the lower opening of the coupling 32. The seal body 26 is allowed to rest in the tubing head 10, as shown in FIG. 1 so that the tapered portion 28 rests against the tapered portion 30 of the tubing head 10. The inner seal sections 40 and 62 are disposed around the coupling 32. The sections 36 and 38 can be positioned so that they go around the cables 20, 22 and 24 and also so that the combined sealing member 34 fits into the recess 44. The gasket 54 then can be placed around the coupling 32 by opening the slit 112 and it can also be placed around the cables 20, 22 and 24 by opening the slits 118. The inner section 62 is next allowed to rest on top of the gasket 54 and the section 58 and 60 are inserted into position so that they are properly received around the cables 20, 22 and 24. With the various holes for the bolts 64 being aligned, the bolts can now be inserted through the holes and into the threaded openings 66 in seal body 26. Tightening the bolts 64 will cause the gasket 54 to tighten around the coupling 32, around the cables 20, 22 and 24, and also to cause the gasket 54 to expand radially outward to contact the inner surface of the opening in the tubing head 10 thereby creating a liquid-tight and gas-tight seal.

To disassemble the sealing device, the reverse operations would be performed. It is important to note that it is never necessary to sever or disconnect the electric cables 20, 22 and 24.

Figure 9:
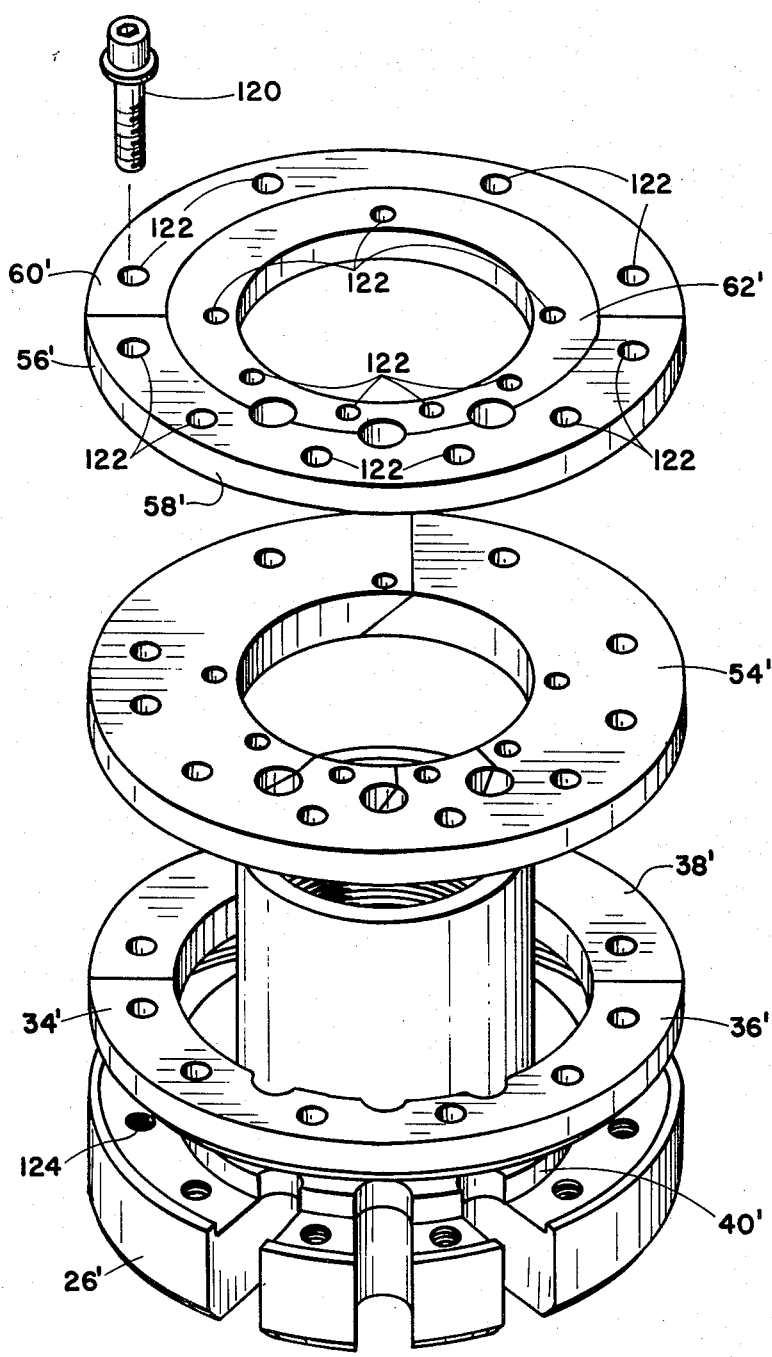
FIG. 9 is an exploded view of a well head seal assembly constructed in accordance with an alternate embodiment of this invention.

FIG. 9 shows a modification of the present invention as embodied in FIGS. 1 through 8. The bolt holes, as described in FIGS. 1 through 8, are located where the inner seal sections meet the outer seal section. In FIG. 9, however, a smaller bolt 120 is employed and fits through smaller holes 122 in sections 58', 60' and 62' of the thus modified upper seal ring 65'. The smaller holes 122 are located entirely within the outer seal sections 36', 38', 58' and 60' and entirely within the inner seal sections 40' and 62' as shown. Similar locations of holes can be seen on the gasket 54' and on the seal body 26'.

Whereas, the present invention has been described in particular relation to the drawings attached hereto, it should be understood that other and further modifications of the invention, apart from those shown or suggested herein, may be made within the spirit and scope of this invention.

What is claimed is:

1. An assembly providing a liquid-tight and gas-tight seal for a well head having an upper cylindrical opening therein, which comprises a ring-shaped seal body positioned in said head, said seal body having an outer cylindrical surface adapted to lie closely adjacent the cylindrical opening of said head, a central circular opening, and a radial slot extending inward from the outer cylindrical surface of said seal body to accomodate a cable therein; a tubular coupling adapted to connect between adjacent portions of tubing, said coupling connected to said seal body at said central opening; a lower seal ring having an inner circular section and an outer circular section, said inner section having a central circular opening adapted to surround said coupling and an outer circular edge, said outer section having an inner circular edge mating with the outer circular edge of said inner section and an outer circular edge adapted to lie closely adjacent the cylindrical opening in said head, said outer section also being split into an arcuate outer front section and an arcuate outer rear section, said outer circular section having a semi-circular hole on its inner edge which mates with a semi-circular hole provided on the outer edge of said inner section to form a passageway for said cable; a pliable rubber gasket positioned in said tubing head above said lower seal ring and surrounding said coupling and having a circular hole and a slit leading thereto from the inner edge to accomodate said cable; an upper seal ring having an inner circular section and an outer circular section, said inner section having a central circular opening adapted to surround said coupling and an outer circular edge, said outer section having an inner circular edge mating with the outer circular edge of said inner section and an outer circular edge adapted to lie closely adjacent the cylindrical opening in said head, said outer section also being split into an arcuate outer front section and an arcuate outer rear section, said outer circular section having a semi-circular hole which mates with a semi-circular hole provided on the outer edge of said inner section to form a passageway for said cable, clamping means extending through said upper seal ring, said rubber gasket, said lower seal ring and into said seal body for locking said seal body, said inner coupling, said lower seal ring, said gasket and said upper seal ring in place in said tubing head and for forming a liquid-tight and gas-tight seal by compressing said gasket.

2. An assembly providing a liquid-tight and gas-tight seal as set forth in claim 1 including at least one more additional slot in said seal body, at least one more additional hole formed by semi-circular holes in said sections of said lower seal ring, at least one more additional hole in said gasket and at least one more additional slit leading from the inner edge thereof, at least one more additional hole formed by semi-circular holes in said sections of said upper seal ring adapted for at least one more additional cable.

3. An assembly providing a liquid-tight and gas-tight seal as set forth in claim 1 wherein said seal body is provided with a top recessed circular portion and said outer circular section of said lower seal ring is provided with a circular reduced portion adapted to fit in said circular recessed portion.

4. An assembly providing a liquid-tight and gas-tight seal as set forth in claim 1 wherein said clamping means includes a plurality of bolts which pass through holes in said upper seal ring formed by semi-circular holes provided along the inner edge of said outer circular section which mate with semi-circular holes provided along the outer edge of said inner circular section, through holes in said gasket, through holes in said lower seal ring formed by semi-circular holes provided along the inner edge of said outer circular section which mate with semi-circular holes provided along the outer edge of said inner circular section and into threaded holes in said seal body.

5. An assembly providing a liquid-tight and gas-tight seal as set forth in claim 1 wherein said means for clamping includes a plurality of bolts passing through holes in said outer circular section and holes in said inner circular section of said upper seal ring, through holes in said gasket, through holes in said outer circular section and holes in said inner section of said lower seal ring, and into threaded holes in said seal body.

6. An assembly providing a liquid-tight and gas-tight seal as set forth in claim 1 wherein said rubber gasket is split to permit said gasket to be placed around said coupling.

* * * * *